May 7, 1968   F. L. JOUANNET   3,381,513
ROD HEADING AND TRIMMING METHOD AND MACHINE
Filed June 11, 1965   3 Sheets-Sheet 1

INVENTOR.
FRANK L. JOUANNET
BY
Oberlin, Maky & Donnelly
ATTORNEYS

May 7, 1968  F. L. JOUANNET  3,381,513
ROD HEADING AND TRIMMING METHOD AND MACHINE
Filed June 11, 1965  3 Sheets-Sheet 2

INVENTOR.
FRANK L. JOUANNET
BY
Oberlin, Maky & Donnelly
ATTORNEYS

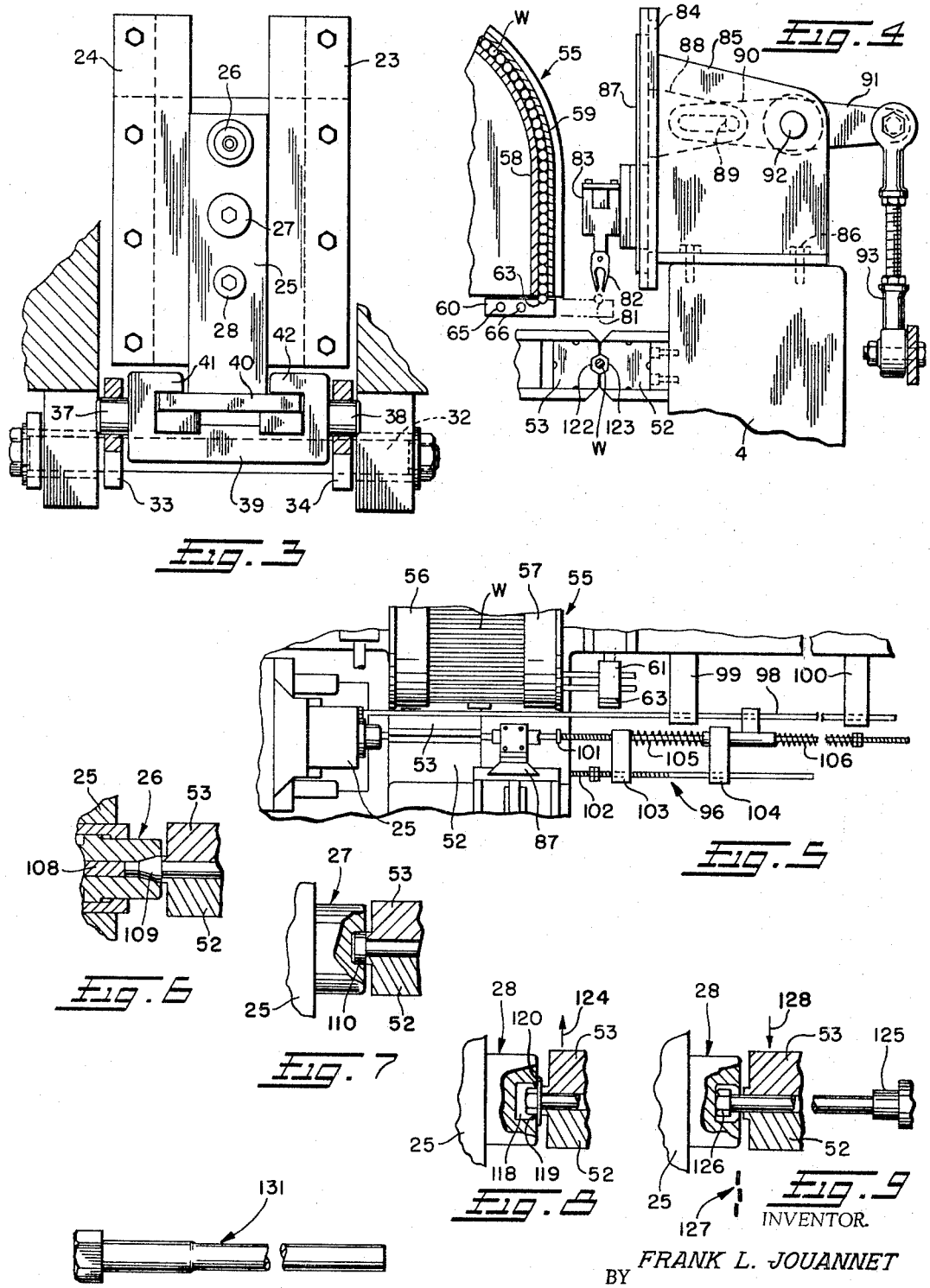

United States Patent Office

3,381,513
Patented May 7, 1968

3,381,513
ROD HEADING AND TRIMMING METHOD
AND MACHINE
Frank L. Jouannet, Shaker Heights, Ohio, assignor to
Auto Bolt and Nut Company, Cleveland, Ohio, a corporation of Ohio
Filed June 11, 1965, Ser. No. 463,245
5 Claims. (Cl. 72—324)

ABSTRACT OF THE DISCLOSURE

A rod heading and trimming machine and method utilizing a pair of gripping dies and a reciprocable header slide with a vertically indexable tool holder thereon, the tools on the holder being operative to form a round fillister head on the workpiece held by the gripping dies and axially to trim flats on the round head while producing flash, the workpiece being momentarily released and driven into the trimming tool and then regripped and held firmly while the trimming tool is pulled from the workpiece, the finished flash-free article then being released and dropped onto a conveyor for discharge from the machine.

Disclosure

This invention relates generally as indicated to a rod heading and trimming method and machine and more particularly to a cold forging process and machine wherein rod stock may be quickly upset and trimmed to the desired configuration.

In forging, where a plurality of operations are required to be performed on rod stock, it is generally conventional to transfer the stock vertically through a plurality of work stations gripping and releasing the work at each station in timed relation to the reciprocation of the header. This, however, usually requires a complex work transfer mechanism to shift the workpiece from one station to the next. Moreover, properly to head cold stock to the required dimensional tolerances often requires various sizing operations since it is difficult to forge accurately the flats or sides of a hex head, for example. It has been found that a better product can be produced by first producing a round fillister head and then trimming or shearing the sides thereof to form a head of the desired configuration. However, the trimming step produces certain additional problems such as flash removal. With the present process and machine, it is possible first to cone the end of the stock, and then form a round fillister head on the stock, trim the sides of the head, and properly remove the flash resulting from the trimming step without transferring the workpiece from one work station to another.

It is accordingly a principal object of the present invention to provide a simplified process for the forming of the ends of bar stock into accurate heads of various configurations.

A further principal object is the provision of a process for the upsetting of bar stock which includes the steps of forming a cone, forging a round fillister head, trimming, and flash removal, without moving the stock from one work station to another.

Another object is the provision of a process for the cold forging of bar stock of substantial size and length which does not require complex work transfer through a plurality of stations.

A further object is the provision of a machine which will practice the above-noted process to produce headed stock of exceptional quality.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 3 is an enlarged fragmentary sectional view taken substantially on the line 3—3 of FIG. 1 illustrating in elevation the header;

FIG. 4 is a fragmentary elevation taken substantially on the line 4—4 of FIG. 1 illustrating the feed mechanism for the stock;

FIG. 5 is a fragmentary top plan view illustrating the stock gauging mechanism;

FIGS. 6 through 9 inclusive are fragmentary horizontal sections taken through the gripping dies illustrating the various steps of the process; and FIG. 10 is a broken elevation of a workpiece which may be produced with the present invention.

Machine—General arrangement

Figure 1:
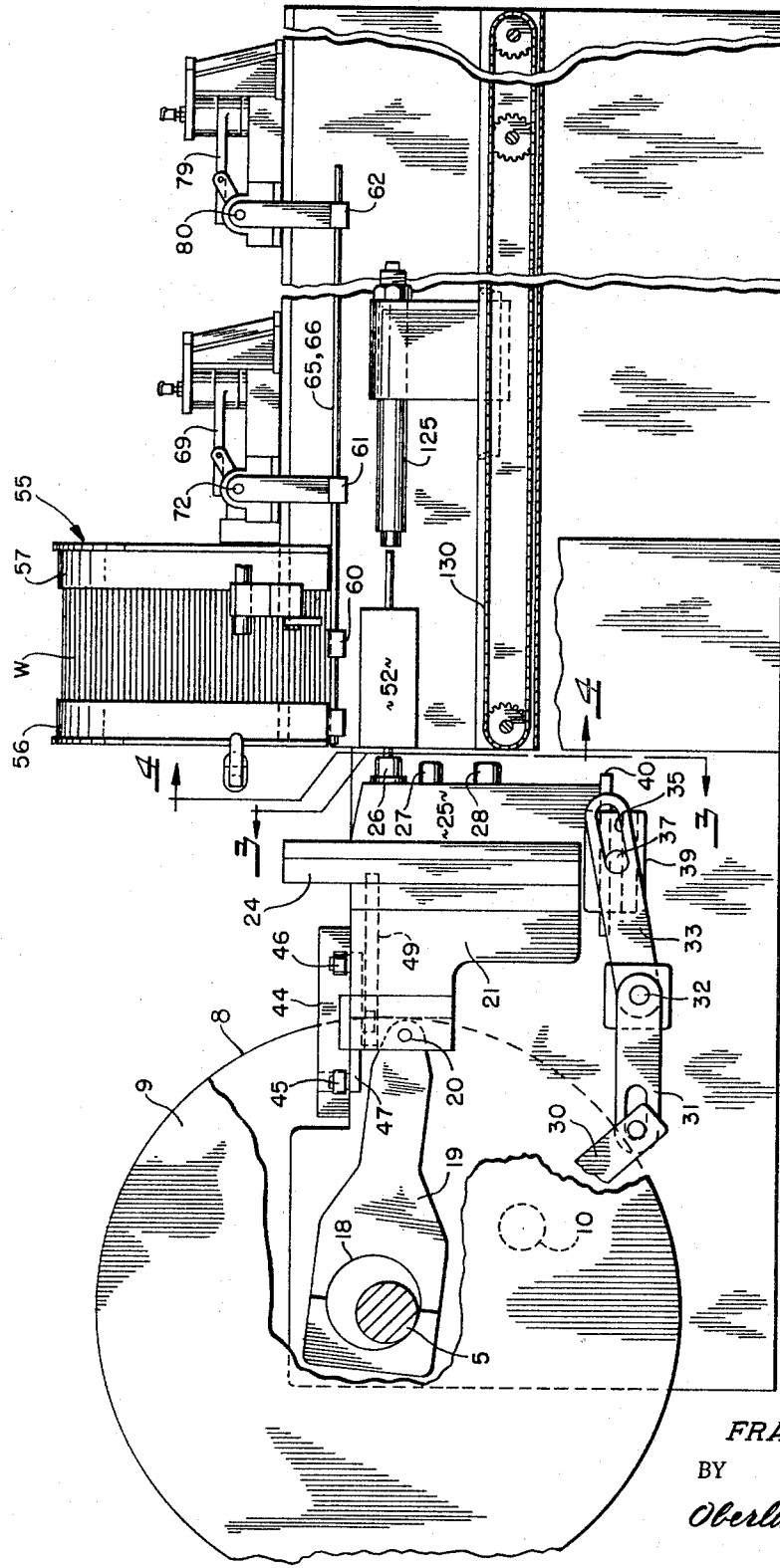
FIG. 1 is a side elevation partially broken away and in section of a machine in accordance with the present invention.
Figure 2:
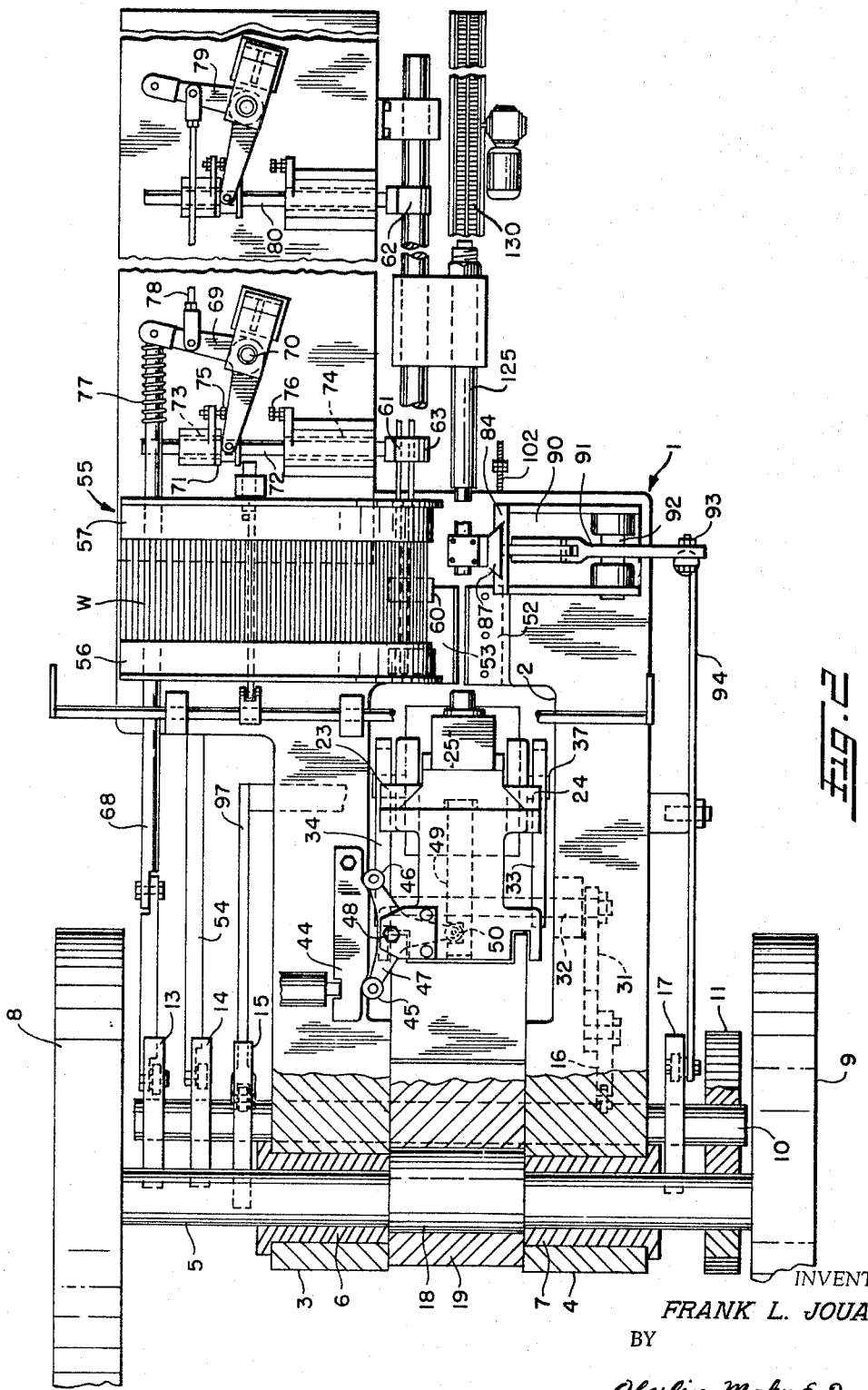
FIG. 2 is a fragmentary top plan view partially broken away and in section of the machine shown in FIG. 1.

Referring now more particularly to FIGS. 1 and 2, there is illustrated a forging machine which comprises a main frame 1 having an opening therein shown at 2 which may be considered the throat of the machine. The frame 1 is divided into portions 3 and 4 on each side of the throat and a main shift 5 is journalled in bearings 6 and 7 in such portions, respectively. The flywheels 8 and 9 may be mounted on opposite ends of the shaft 5 and such shaft may be driven from a motor, not shown, in conventional manner.

An auxiliary shaft 10 is also journalled in the frame portions 3 and 4 beneath and forward of the main shaft 5 and may be driven therefrom in timed relation by the gear train 11 illustrated schematically. The auxiliary shaft 10 may have mounted thereon a plurality of cams as shown at 13, 14, 15, 16 and 17 operating various components of the machine in timed relation to the rotation of the main shift 5.

The main shaft 5 includes an eccentric 18 between the frame portions 3 and 4 on which is journalled crank 19 which is connected at 20 to header slide 21. The header slide 21. The header slide 21 is mounted in the throat of the machine in horizontally extending ways for horizontal reciprocation which will be obtained by the eccentric 18. The header slide 21 at its forward end includes vertically extending ways 23 and 24 mounting tool holder 25 for vertical reciprocation on the header slide 21. The vertically reciprocable tool holder 25 contains vertically spaced tools as illustrated with the top tool 26 being the cone forming die, the middle tool 27 being the fillister die, and the bottom tool 28 being the trimming die.

Vertical reciprocation of the tool holder 25 in timed relation to the horizontal reciprocation of the header slide 21 may be obtained by cam 16 operative to reciprocate arm 30 seen in FIG. 1 which then oscillates arm 31 about pivot shaft 32. The pivot shaft 32 is journalled in the frame portions 3 and 4 and has secured thereto oppositely extending arms 33 and 34 which have elongated slots 35 in the distal ends thereof. Such slots accommodate oppositely extending pins 37 and 38 mounted on saddle 39. The saddle 39 as seen in FIG. 3 is slidably mounted on bottom plate 40 of the tool holder 25 by means of gibs 41 and 42.

As seen more clearly in FIG. 2, a linear cam 44 is mounted on the frame portion 3 engaging followers 45 and 46 mounted on triangular link 47 pivoted at 48 to the top of the header slide. As the header slide reciprocates, the link 47 is oscillated through a relatively short stroke by the linear cam 44 to actuate a wedge mechanism shown schematically at 49 and connected at 50 to the triangular link 47. Such wedge mechanism is employed to lock the tool holder 25 in its position of vertical adjustment obtained by the linkages 31 through 33 as the header slide reciprocates.

Adjacent the tools 26 through 28 there is mounted a stationary gripping die 52 and horizontally opposite such die is a horizontally reciprocable gripping die 53. The reciprocable gripping die 53 may be operated from cam 14 through follower link 54 and through an intermediate toggle mechanism not shown.

In conventional manner as seen in FIG. 4, the stationary and movable gripping dies 52 and 53, respectively are provided with opposed horizontal recesses to engage and grip a workpiece W which when the movable die 53 is closed will be firmly held between such dies.

The workpieces W are fed from a magazine shown generally at 55 which is comprised of laterally adjustable guides 56 and 57, each of which comprises spaced rails 58 and 59 as seen in FIG. 4 guiding the workpieces therebetween. The workpieces W may be fed into the magazine 55 from a conveyor or hopper or other suitable mechanism, not shown, and such workpieces are transferred from the bottom of the magazine horizontally to a position vertically above the parting line of the gripping dies by shuttle bars such as shown at 60, 61 and 62. Each of the illustrated shuttle bars is provided with a recess seen at 63 in the top surface thereof which acts as a saddle to receive the elongated workpiece. The shuttle bars 61 and 62 may be employed for longer workpieces than those illustrated as being used in the machine. In such case, the guide 57 may be laterally adjusted to accommodate such longer workpieces.

The shuttle bars 60 through 62 are interconnected by parallel rods 65 and 66 and are moved a short distance horizontally by the cam 13 on the auxiliary shaft 10. Such cam 13 operates linkage 68 connected to bell crank 69 mounted for oscillatory movement at 70 on the frame 1. The opposite end of the bell crank is connected to the yoke 71 on rod 72 reciprocably mounted in bushings 73 and 74 on top of the frame 1. Stop screws 75 and 76 limit the stroke of the bell crank 69 and a spring 77 may be employed to accommodate overtravel.

A connecting rod 78 extends from the bell crank 69 to a further bell crank 79 connected to rod 80 to move the latter in synchronism with the rod 72. The rod 72 is connected to the shuttle bar 61 and the rod 80 to the shuttle bar 62 with all three shuttle bars being interconnected by the parallel rods 65 and 66. It can thus be seen that rod stock of substantial length may be accommodated on the machine.

When the stock or workpiece to be formed has been transferred to a position vertically above the parting line of the gripping dies as indicated in phantom lines at 81 in FIG. 4, a set of fingers 82 mounted on block 83 is then moved vertically to engage the stock while still held in the recesses of the shuttle bars. Such fingers may have resilient characteristics and will retain the stock when the shuttle bars are removed or reciprocated back to a position beneath the magazine to receive the next workpiece. The fingers 82 are mounted for vertical movement in ways 84 mounted on upstanding frame 85 secured by suitable fasteners 86 to the frame portion 4. The block 83 is secured to a slide 87 which is mounted in the ways 84 for vertical movement and such slide includes a rearwardly projecting plate 88 connected by pin 89 to the slotted and clevised end 90 of oscillating arm 91. The arm 91 is mounted for oscillation at 92 in the frame 85 and such oscillation is obtained through the adjustable link 93 and the rocker arm 94 moving at the direction of cam 17. The vertical movement of the fingers 82 will thus position the workpiece vertically betwen the gripping dies when the latter are open and after the shuttle bars have been retracted. It will be understood that additional sets of fingers may be provided for longer workpieces.

Referring now to FIGS. 2 and 5, it will be seen that the workpiece W, after being gripped by the fingers 82 and before being vertically positioned between the gripping dies 52 and 53, may be gauged by the mechanism generally shown at 96. This mechanism may be operated by the cam 15 through the linkages 97 which is in turn effective to reciprocate rod 98 shown in FIG. 5. Such rod may be mounted upon brackets 99 and 100 secured to the frame. Actual gauging of the workpiece is accomplished by the adjustable stop or abutment 101 which is effective to push the workpiece forward or toward the heading die to an extent permitted by the adjustable stop 102 which will engage the frame portion 4 adjacent the throat of the machine. The stops 101 and 102 are carried parallel to each other on the mounting brackets 103 and 104, both of which are carried by the reciprocating rod 98. Overtravel of the rod 98 is accommodate by the spring 105 and 106 between which the bracket 104 is interposed.

When the workpiece W is thus properly horizontally oriented with respect to the gripping dies, the fingers 82 then descend to position the workpiece to be gripped by the gripping dies as the movable gripping die 53 closes thereupon. The fingers then retract upwardly to the position shown in FIG. 4 to await reception of the next workpiece. With the workpiece thus properly gauged and now gripped by the gripping dies, the header tooling will now move through its horizontal and vertical cycle properly to shape one end of the stock.

*Operation*

The first operation to be performed on the projecting end of the workpiece will be that of cone forming the end to the shape more clearly shown in FIG. 6. The actual conforming die 26 is slidably mounted in the tool holder 25 and a positive rod stop 108 cooperates with the slidably mounted cone forming die to form the projecting end of the workpiece into the shape shown. As the header slide 21 retracts, the cam operated linkages 31 through 33 will then index the tool holder 25 upwardly to position the fillister heading tool 27 in the proper position to engage the coned workpiece. It will, of course, be appreciated that at each stroke of the header slide, the linear cam 48 and the triangular rocker 47 is effective to lock the tooling in the proper vertical position as the eccentric 18 causes the header slide to move back toward the workpiece.

The fillister head tooling 27 will then engage the cone 109 on the projecting workpiece and form the same into the round fillister head 110. After the formation of the round cylindrical fillister head, the tool holder 25 is elevated further to align the trimming die 28 with the workpiece still firmly gripped by the gripping dies 52 and 53.

The trimming die includes a recess 111 which is constricted at its open end by the shearing blade 119 which may be of the configuration desired to be imparted to the periphery of the workpiece. In the illustrated embodiment such configuration is hexagonal. As the trim die 28 is driven axially over the round fillister head 110, it will be effective to shear chordal segments from the periphery of the round fillister head placing sheared flats on the sides thereof. The shearing operation will produce flash 120 between the trim die and the gripping dies 52 and 53 which appears as petals or fingers projecting radially from the base of the head, there being one petal or finger for each of the flats produced.

The face of the gripping dies 52 and 53 are each provided with cooperating projections or buttons 122 and 123 as seen in FIG. 4 which form a hexagonal projection on the gripping dies behind the head of the workpiece and the flats of the hexagon thus formed correspond to the hexagonal flats of the trim die. The hexagonal button on the gripping die permits a slight clearance between the face of the trim die and the gripping dies so that the flash per face is bent outwardly to be positioned therebetween. Now, cleanly to remove the flash, the movable gripping die 53 is moved slightly in the direction of the arrow 124 releasing the gripping pressure on the workpiece and yet not dropping it and the back end of the workpiece is then hit by a kicker bar 125 to cause the head 126 to move within the trim die completely severing the flash from the base of the head which will fall free as indicated at 127.

The movable gripping die 53 is now returned to its gripping position in the direction of the arrow 128 firmly to grip the workpiece as the trim die is now pulled out. This, of course, prevents the trim die from pulling the workpiece from the gripping dies so that when the gripping dies open the workpiece will be discharged onto the take-away conveyor 130 shown in FIG. 1. The kicker is operated from the auxiliary shaft 10 by a cam mechanism not shown and is effective simply to tap the back end of the workpiece to cause the head to move within the trim die effective cleanly to sever the flash from the base of the head. After the workpiece has been dropped onto the conveyor 130 it will be discharged to the right as seen in FIG. 1, and the linkages 30, 31 and 33 will now lower the tooling to the horizontal position seen in FIG. 1, and the feed mechanism will now horizontally position the next workpiece to be gripped by the fingers 82 to be gauged and then vertically positioned to be gripped by the gripping dies 52 and 53. Once gripped by the gripping dies, the horizontal and vertical movements of the tool holder 25 will be repeated quickly to form the same precise head configuration on the workpiece.

It can now be seen that there is provided a process and machine for the accurate formation of rod stock which may be of substantial size, as for example, 0.50 inch in diameter and of substantial length, i.e. in excess of several feet. Moreover, the operations for the formation of the head on the stock such as the cone forming, fillister head, trimming and flash removal, can be accomplished without vertically moving the workpiece through a plurality of work stations. It will be appreciated that each of the tooling 26, 27 and 28 may be mounted on the tool holder 25 for accurate adjustment so that such tooling may be quickly and conveniently aligned with the gripped workpiece in the various positions of the tool holder. Moreover, of course, a trim die of any desired configuration may be provided, and the cooperation of the trim die, gripping dies, and the kicker will be effective cleanly to remove the flash and provide the workpiece 131 shown in FIG. 10 of the desired precise configuration.

Other modes of applying the principle of the invention may be employed, change being made as regards the details described, provided the features stated in any of the following claims or the equivalent of such be employed.

I, therefore, particularly point out and distinctly claim as my invention:

1. A process for cold forging bar stock comprising the steps of gauging such stock, firmly gripping such gauged stock between gripping dies with one end projecting therefrom, cone forming such one end of such stock, forming such coned end into a round fillister head, and then axially moving a shearing tool over such round fillister head to shear chordal segments from such head with such shearing operation resulting in the formation flash secured to the base of the head and extending radially between such shearing tool and such gripping dies, holding such shearing tool in position, then slightly separating such gripping dies to release such firm grip, axially slightly moving such stock with respect to such shearing tool to remove such flash formed by such shearing, and again firmly gripping such stock and then axially removing such shearing tool therefrom.

2. The process set forth in claim 1 including the step of again separating such gripping dies to release the now formed work therefrom to drop onto a discharge conveyor.

3. In a process for cold forging bar stock, the steps of firmly gripping such stock, cone forming one end of such stock, forming such coned end into a round fillister head, and shearing chordal segments from such head with a shearing tool, all of such coning, rounding and shearing steps being performed while such stock is still gripped firmly, then releasing such firm grip and axially slightly moving such stock with respect to the shearing tool to remove flash formed by such shearing, and again gripping such stock after removal of such flash to facilitate withdrawal of the shearing tool from such stock.

4. A method of heading elongated round stock comprising the steps of firmly gripping such stock, upsetting an end of such stock into a round cylindrical head, moving a shearing tool axially of such head to shear chordal segments therefrom thus producing radially extending elements of flash between such tool and gripping dies, momentarily slightly separating such gripping dies, pushing such stock into such tool to shear such flash from such stock, again gripping such stock after such flash removal, pulling such shearing tool therefrom, and then separating such gripping dies to discharge such formed stock.

5. In a cold forging machine of the type having a pair of gripping dies and a reciprocable header slide with a vertically indexable tool holder thereon, means to gauge and then position a workpiece between said gripping dies to be gripped thereby, tool means on said holder operative to form a round fillister head on said workpiece, a hollow trim die on said tool holder operative axially to trim flats on said round head while producing flash between said trim die and gripping dies, means operative momentarily to release the gripping pressure on such workpiece from said gripping dies and axially to push the same into such hollow trim die to remove such flash, and means operative to pull said hollow trim die from the workpiece after the latter is again gripped by said gripping dies.

References Cited

UNITED STATES PATENTS

| | | | |
|---|---|---|---|
| 1,894,526 | 1/1933 | Wilcox | 10—166 |
| 2,036,758 | 4/1936 | Johnson | 10—27 |
| 2,155,920 | 4/1939 | Alberts | 10—12.5 |
| 2,265,428 | 12/1941 | Hogue | 10—12.5 |
| 2,362,970 | 11/1944 | Bolland | 10—12.5 |
| 2,390,170 | 12/1945 | Poole | 10—166 |

CHARLES W. LANHAM, *Primary Examiner.*

G. P. CROSBY, *Assistant Examiner.*